United States Patent
Cayton et al.

(10) Patent No.: US 11,635,113 B2
(45) Date of Patent: Apr. 25, 2023

(54) CLUTCH ASSEMBLY AND INTEGRATED ARB/GUARD

(71) Applicant: Horton, Inc., Roseville, MN (US)

(72) Inventors: Robert Cayton, Blaine, MN (US);
Samuel Buck, St. Paul, MN (US);
Jonathan Ackermann, Circle Pines, MN (US)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 17/757,349

(22) PCT Filed: Jan. 19, 2021

(86) PCT No.: PCT/US2021/070051
§ 371 (c)(1),
(2) Date: Jun. 14, 2022

(87) PCT Pub. No.: WO2021/151110
PCT Pub. Date: Jul. 29, 2021

(65) Prior Publication Data
US 2023/0010456 A1  Jan. 12, 2023

Related U.S. Application Data

(60) Provisional application No. 62/963,599, filed on Jan. 21, 2020.

(51) Int. Cl.
*F16D 27/112* (2006.01)
*F16D 27/14* (2006.01)

(52) U.S. Cl.
CPC ............ *F16D 27/112* (2013.01); *F16D 27/14* (2013.01)

(58) Field of Classification Search
CPC ............................. F16D 27/112; F16D 57/14
(Continued)

(56) References Cited

U.S. PATENT DOCUMENTS

| 2,099,750 A | 11/1937 | Peo et al. |
| 3,444,748 A | 5/1969 | Sutaruk |

(Continued)

FOREIGN PATENT DOCUMENTS

| CN | 202753921 U | 2/2013 |
| CN | 207499965 U | 6/2018 |

(Continued)

OTHER PUBLICATIONS

JIT Truck Parts, "Horton Anti-Rotation Bracket with Jumper Harness, Part No. 995580", <https://web.archive.org/web/20191030194412/https://www.jittruckparts.com/bracket-anti-rotation-w-jumper-995580> Archived Oct. 30, 2019 (2 pages).

(Continued)

*Primary Examiner* — Colby M Hansen
(74) *Attorney, Agent, or Firm* — Westman, Champlin & Koehler, P.A.

(57) ABSTRACT

A clutch assembly includes a stationary journal bracket assembly having a base, a stub shaft that extends axially from the base, and a passage, a threaded bracket journal coupled to the stub shaft and accessible through the passage, pulley bearings supported on the threaded bracket journal, an integrated pulley/shaft including a pulley and a center shaft, and a clutch mechanism. The center shaft includes a cup-like hub and a distal portion that extends axially from the cup-like hub. The cup-like hub is supported on the pulley bearings, located at least partially within a blind hollow interior area of the cup-like hub. The threaded bracket journal is located at least partially within the hollow interior area of the cup-like hub.

24 Claims, 5 Drawing Sheets

(58) Field of Classification Search
USPC ........................................................ 192/84.1
See application file for complete search history.

(56) References Cited

U.S. PATENT DOCUMENTS

| | | | |
|---|---|---|---|
| 3,661,237 A | 5/1972 | Thompson | |
| 3,824,807 A | 7/1974 | Hecht | |
| 4,068,907 A | 1/1978 | Zenthoefer | |
| 4,073,370 A | 2/1978 | Tinholt | |
| 4,074,662 A | 2/1978 | Estes | |
| 4,320,723 A | 3/1982 | Wendling et al. | |
| 4,346,797 A | 8/1982 | Bopp | |
| 4,355,709 A | 10/1982 | Light | |
| 4,355,710 A | 10/1982 | Schilling | |
| 4,402,678 A | 9/1983 | St. John | |
| 4,544,054 A | 10/1985 | Brown | |
| 4,579,206 A | 4/1986 | Velderman et al. | |
| 4,824,422 A | 4/1989 | Jocic | |
| 4,838,841 A | 6/1989 | Harvey | |
| 5,163,883 A | 11/1992 | Bradfield | |
| 5,195,241 A | 3/1993 | Bradfield | |
| 5,205,387 A | 4/1993 | Checa | |
| 5,408,897 A | 4/1995 | Klinar | |
| 5,627,422 A | 5/1997 | Boggs, III et al. | |
| 5,941,357 A * | 8/1999 | Tabuchi | F16D 27/112 192/84.961 |
| 6,071,206 A | 6/2000 | Monahan et al. | |
| 6,102,022 A * | 8/2000 | Schave | B28D 1/045 299/39.3 |
| 6,109,871 A | 8/2000 | Nelson et al. | |
| 6,129,193 A | 10/2000 | Link | |
| 6,237,731 B1 | 5/2001 | Sykes | |
| 6,293,885 B1 | 9/2001 | Serkh et al. | |
| 7,041,020 B2 | 5/2006 | Singer | |
| 7,047,911 B2 | 5/2006 | Robb et al. | |
| 7,108,623 B2 | 9/2006 | Cadarette et al. | |
| 7,913,826 B2 | 3/2011 | Boyer | |
| 8,342,308 B2 | 1/2013 | Jayaram et al. | |
| 8,627,936 B2 | 1/2014 | Boyer | |
| 8,887,888 B2 | 11/2014 | Hennessy et al. | |
| 8,893,868 B2 | 11/2014 | Kennedy | |
| 9,062,759 B2 | 6/2015 | Arnault et al. | |
| 9,074,626 B2 | 7/2015 | Takahashi et al. | |
| 9,086,102 B2 | 7/2015 | Swanson et al. | |
| 9,746,106 B1 | 8/2017 | Wilson et al. | |
| 9,810,308 B2 | 11/2017 | Quincay et al. | |
| 9,863,520 B2 | 1/2018 | Tembreull et al. | |
| 10,385,932 B2 | 8/2019 | Krammer et al. | |
| 2007/0023251 A1* | 2/2007 | Juergensmeyer | F16D 27/112 192/84.2 |
| 2010/0234157 A1 | 9/2010 | Kikukawa et al. | |
| 2012/0138414 A1 | 6/2012 | Son et al. | |
| 2012/0279820 A1 | 11/2012 | Hennessy et al. | |
| 2015/0125103 A1 | 5/2015 | Ciulla et al. | |
| 2016/0097431 A1 | 4/2016 | Skaggs et al. | |
| 2016/0169235 A1 | 6/2016 | Ignatovich | |

FOREIGN PATENT DOCUMENTS

| | | |
|---|---|---|
| DE | 4213203 C1 | 9/1993 |
| EP | 1404989 B1 | 11/2007 |
| EP | 2923102 B1 | 3/2017 |
| JP | H09-226405 A | 9/1997 |
| JP | 5569870 B2 | 8/2014 |
| WO | 2000024112 A1 | 4/2000 |
| WO | 2007109278 A1 | 9/2007 |
| WO | 2010056830 A2 | 5/2010 |
| WO | 2014159374 A1 | 10/2014 |
| WO | 2016187016 A2 | 11/2016 |
| WO | 2018004833 A1 | 1/2018 |
| WO | 2018144428 A1 | 8/2018 |
| WO | 2019082025 A1 | 5/2019 |

OTHER PUBLICATIONS

International Search Report and Written Opinion in corresponding International Application No. PCT/US2021/070051 dated Apr. 29, 2021.

* cited by examiner

CLUTCH ASSEMBLY AND INTEGRATED ARB/GUARD

The present application is a Section 371 National Stage Application of International Application No. PCT/US2021/070051, filed Jan. 19, 2021 and published as WO 2021/151110 A1 on Jul. 29, 2021, in English, and further claims priority to U.S. provisional patent app. Ser. No. 62/963,599, filed Jan. 21, 2020.

FIELD

The present invention relates generally to clutch assemblies, and associated methods of manufacturing and use. Additionally, the present invention relates to an integrated anti-rotation bracket (ARB) and guard, which can be utilized with various clutch mounting assemblies and methods.

BACKGROUND

Clutches have been successfully deployed in automotive applications to drive cooling fans and pumps. Viscous clutches, in particular, are desirable for many automotive and industrial equipment applications because they are able to control torque transmission over a relatively wide speed range. Viscous clutches are also desirable due to the use of a shearing fluid as the torque transfer mechanism, because shearing fluid (for example, silicone oil) has a relatively long service and life and is generally maintenance free.

There is an automotive market segment that uses viscous clutches that are mounted to drive hubs rather than directly to an engine crankshaft. These drive hubs are rigidly attached to the engine block and provide input rotational speed from an engine through a belt that couples to the viscous clutch shaft with a pulley (also called a sheave). The viscous clutch then provides rotational speed to the fan or other output as needed or desired. Examples of such clutch assemblies include that disclosed in PCT International Pat. App. Pub. No. WO2011/062856A2 and the RCV®250 fully-variable fan drive available from Horton, Inc. (Roseville, Minn., USA).

However, direct mounted drive hubs present a number of challenges. For example, clutch assemblies with separate pulleys can have a relatively high part count, which can both increase the number of steps to fabricate the clutch assembly but can also lead to additional labor expenditure to install and/or maintain the clutch assembly. Moreover, FIG. 1 of PCT International Pat. App. Pub. No. WO2011/062856A2, for instance, discloses a prior art drive hub configuration in which the pulley bearings are secured on a stationary journal bracket shaft by a nut accessible only from the front, while a pulley and clutch shaft are connected together by other fasteners. In that prior art configuration, removal of the pulley bearings from the journal bracket shaft first requires removal of the pulley, which increases the overall effort by a mechanic. Fasteners orientated parallel to the axis of rotation are difficult to access and not readily visible for the mechanic, increasing maintenance time. Such fasteners for mounting a pulley are especially difficult to access due to their positions, typically facing forward at or near a rear of the clutch assembly behind and/or obstructed by various components of the clutch assembly. In order to provide adequate clearance for access to such fasteners, portions of the clutch assembly may be prohibited from occupying a space adjoining the location of such fasteners, thus limiting the range of options for the configuration of the clutch assembly and/or increasing the overall axial dimensions of the assembly when installed.

Furthermore, when viscous clutches are used, there is a requirement to functionally hold a coil/activation/control assembly and associated cable against rotation. Typically, this anti-rotation function is achieved by connecting the cable and/or coil assembly to another stationary point on the engine. It is then possible to provide electrical current to the coil/activation assembly, which selectively activates the viscous clutch valve in order to control the amount of viscous shearing fluid in a working chamber of the clutch and, thus, the output rotational speed of the clutch.

Also, when using a viscous clutch, the control of the clutch is either handled by an engine control unit or engine control module (ECU/ECM) or a separate clutch controller external to the ECU/ECM. When an external controller is used, it translates ECU/ECM signals into a usable signal to actuate the clutch valve. When an external controller is used, it is necessary to secure the controller somewhere stationary (that is, non-rotating) in the engine compartment. The external controller is operatively connected to the ECU/ECM and the clutch coil assembly.

However, belts located in close proximity to the external controller, whether those belts are connected to the clutch or other components in the engine compartment, may break or "buck" during operation. Belt breakage or "bucking" events may produce belt contact with the external controller and/or cable(s) or wire(s), which can damage the external controller and/or cable(s) or wire(s).

SUMMARY

In one aspect, a clutch assembly includes a journal bracket assembly having a base, a stub shaft that extends axially from the base, and a passage that extends through the base and the stub shaft between opposite front and rear openings, a threaded bracket journal threadably coupled to the stub shaft and accessible through the rear opening of the passage, pulley bearings supported on the threaded bracket journal in a radial direction, an integrated pulley/shaft including a pulley and a center shaft, and a clutch mechanism. The journal bracket assembly is rotationally stationary. The center shaft includes a cup-like hub and a distal portion that extends axially from the cup-like hub. The cup-like hub is supported on the pulley bearings, which are located at least partially within a hollow interior area of the cup-like hub. The threaded bracket journal is located at least partially within the hollow interior area of the cup-like hub. The hollow interior area of the cup-like hub is blind from front and radial directions. The clutch mechanism is supported on the distal portion of the center shaft, with the distal portion of the center shaft defining an axis of rotation of the clutch mechanism.

In another aspect, a method of making a clutch assembly includes installing pulley bearings on a threaded bracket journal, installing an integrated pulley/shaft on the pulley bearings, with the pulley bearings positioned at least partially within a blind interior area of a cup-like hub of the integrated pulley/shaft, installing a coil assembly on the integrated pulley/shaft after the integrated pulley/shaft is installed on the integrated pulley/shaft, installing a housing base on the integrated pulley/shaft after the coil assembly is installed on the integrated pulley/shaft, installing a rotor assembly on the integrated pulley/shaft after the housing base is installed on the integrated pulley/shaft, installing a housing cover on the integrated pulley/shaft after the rotor assembly is installed on the integrated pulley/shaft, assembling a journal bracket assembly to the threaded bracket journal after the housing cover is installed on the integrated pulley/shaft, engaging a tool with a torque feature of the threaded bracket journal to threadably couple the threaded bracket journal and the journal bracket assembly. The tool is inserted through a rear opening and into a passage in the journal bracket assembly.

In yet another aspect, an integrated anti-rotation bracket (ARB) and guard assembly suitable for use with a clutch includes a body portion that extends axially, a flange that extends from the body portion, a barrier that extends from the body portion and is axially spaced from the flange, a mounting extension that extends from the body portion, and a harness attached to the mounting extension at a location aligned with the barrier in an axial direction.

The present summary is provided only by way of example, and not limitation. Other aspects of the present invention will be appreciated in view of the entirety of the present disclosure, including the entire text, claims and accompanying figures.

Figure 1:
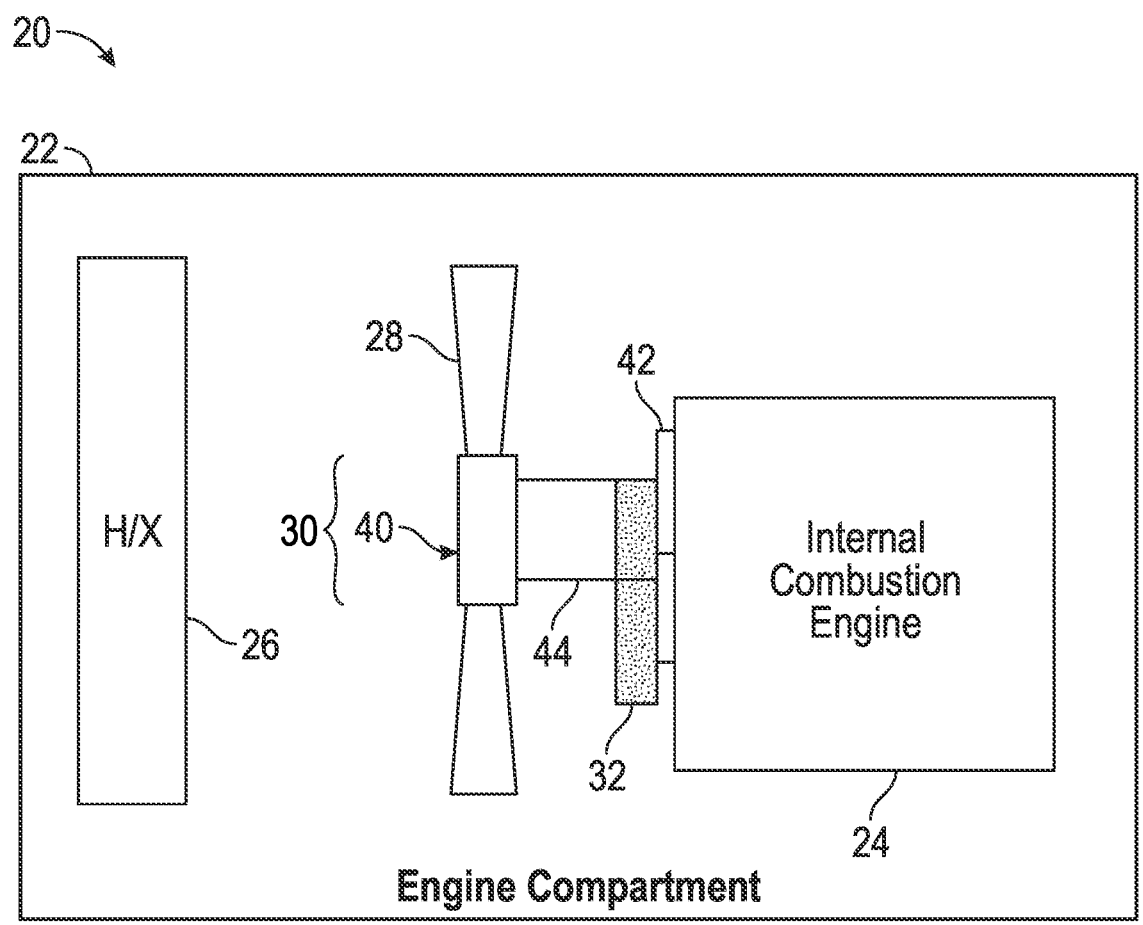
FIG. 1 is a schematic illustration of a system including a clutch assembly according to an embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In one aspect, the present invention relates to a clutch assembly suitable for mounting a clutch, such as a fan clutch, to a mounting location in an engine compartment. Embodiments of the clutch assembly can include a journal bracket (or simply a "bracket") with a stub shaft having a passage that extends entirely through the sub shaft and has openings at opposite front and rear sides or ends, plus a threaded bracket journal that can be threadably engaged with the stub shaft to secure a pulley bearing, an integrated pulley/shaft, and/or the like to the stub shaft. A clutch mechanism can be supported by an engagement with the shaft of the integrated pulley/shaft with the integrated pulley/shaft providing a torque input to the clutch mechanism via a "live" center shaft portion of the integrated pulley/shaft. Tooling can be engaged with the threaded bracket journal through the passage in the journal bracket stub shaft in order to apply torque to tighten the threaded engagement between those components. Such tooling can be inserted from a rear opening of the passage even when the front opening is obstructed by other components, such as by the integrated pulley/shaft, the clutch mechanism, or the like. In this way, a secure connection between the integrated pulley/shaft and the stub shaft can be made in a blind or semi-blind manner. Among other benefits, such a configuration of the clutch assembly further permits the relatively massive journal bracket components to be assembled close to the end of the manufacturing process, so that in an assembly-line type manufacturing environment only a smaller and lighter workpiece (without the heavy journal bracket) needs to be moved through most of the manufacturing and assembly stations. In some embodiments, the integrated pulley/shaft to be a single monolithic piece in some embodiments, which helps to limit total part count, reduce mass, and limit part clearance spacing requirements. In other embodiments, the integrated pulley/shaft can be made up of separate pulley and shaft components connected together, such as with suitable fasteners, which helps simplify casting, machining, and/or other steps used to fabricate the integrated pulley/shaft while still allowing for limited part clearance spacing requirements, among other benefits. An associated method of making and using a clutch assembly is also disclosed.

In another aspect, the present invention relates to an integrated anti-rotation bracket (ARB) and guard, which can be installed so as to engage both the journal bracket and a coil assembly of the clutch mechanism. The integrated ARB and guard, when installed, provides an anti-rotation function to resist or prevent rotation of the coil assembly and further acts as a guard to shield and protect a controller, cables, wires, and/or other components from contact with a belt. Among other features and benefits, the integrated ARB and guard further can provide a mounting location for an external clutch controller (for instance, an optional Di+® controller available from Horton, Inc., Roseville, Minn., USA). The integrated ARB and guard can be utilized with the presently-disclosed clutch mounting assembly or in other applications.

The present application claims priority to U.S. provisional patent application Ser. No. 62/963,599, filed Jan. 21, 2020, which is hereby incorporated by reference in its entirety.

FIG. 1 is a schematic illustration of an embodiment of a cooling system 20 that includes an engine compartment 22, an internal combustion engine 24, a heat exchanger (H/X) 26, a fan 28, a clutch assembly 30, and a belt 32. The clutch assembly 30 of the illustrated embodiment includes a clutch mechanism 40, a journal bracket (or drive hub) assembly 42, and a pulley (also called a sheave) or integrated pulley/shaft 44. The belt 32 transmits torque from the internal combustion engine 24 to the integrated pulley/shaft 44, which in turn transmits torque to the clutch mechanism 40. The clutch mechanism 40 selectively controls torque transmission from the integrated pulley/shaft 44 to the fan 28. The fan 28 can be a cooling fan and can generate airflows through the heat exchanger 26 and/or around the internal combustion engine 24. The journal bracket assembly 42 permits the clutch mechanism 40 to be mounted to a mounting location within the engine compartment 22, such as being mounted to an engine block of the internal combustion engine 24. The clutch mechanism 40 can be a viscous clutch, which can be controlled using an electromagnetic control scheme of a type known in the art.

Figure 2:
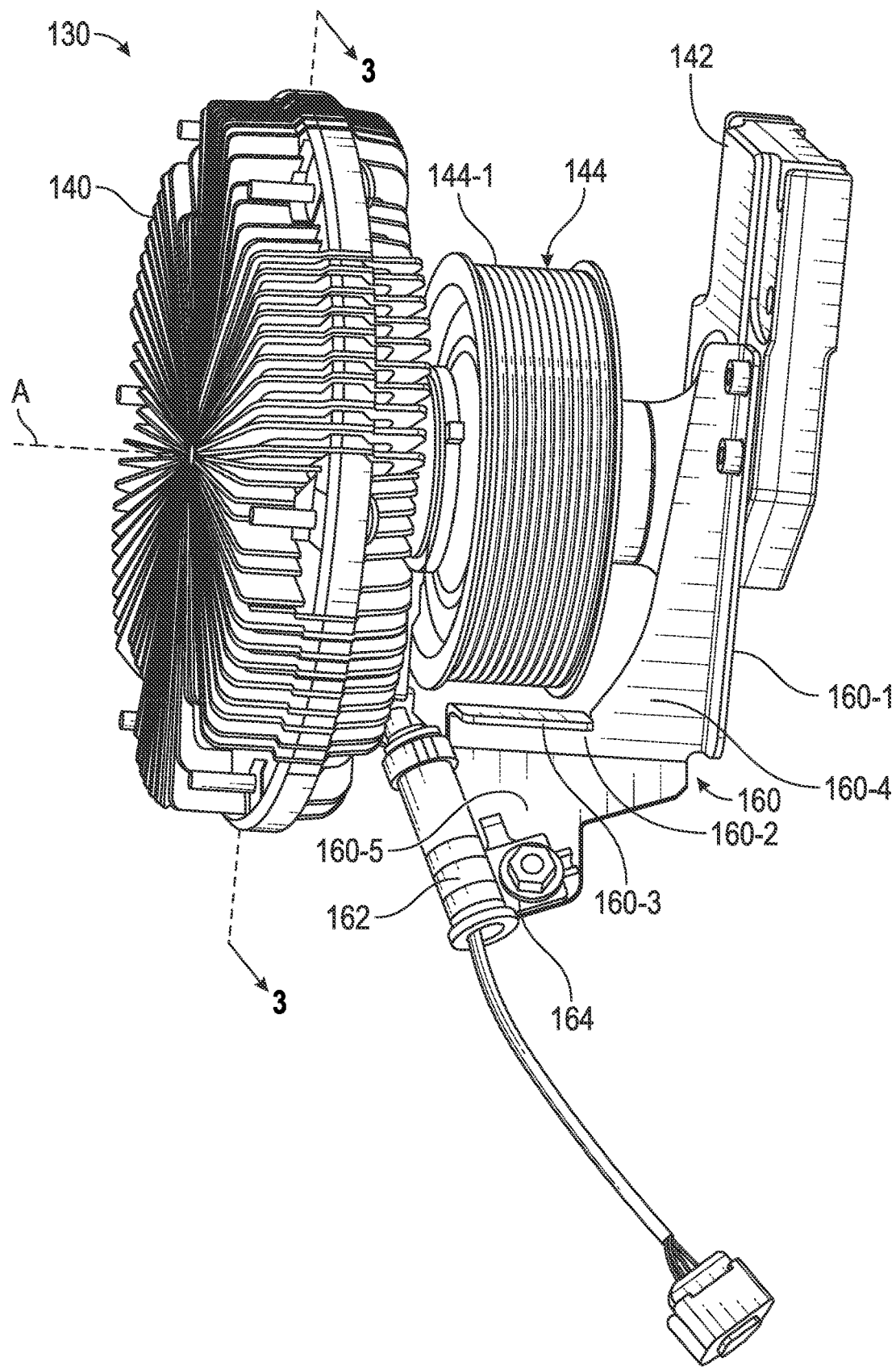
FIG. 2 is a perspective view of a clutch assembly according to an embodiment of the present invention.
Figure 3:
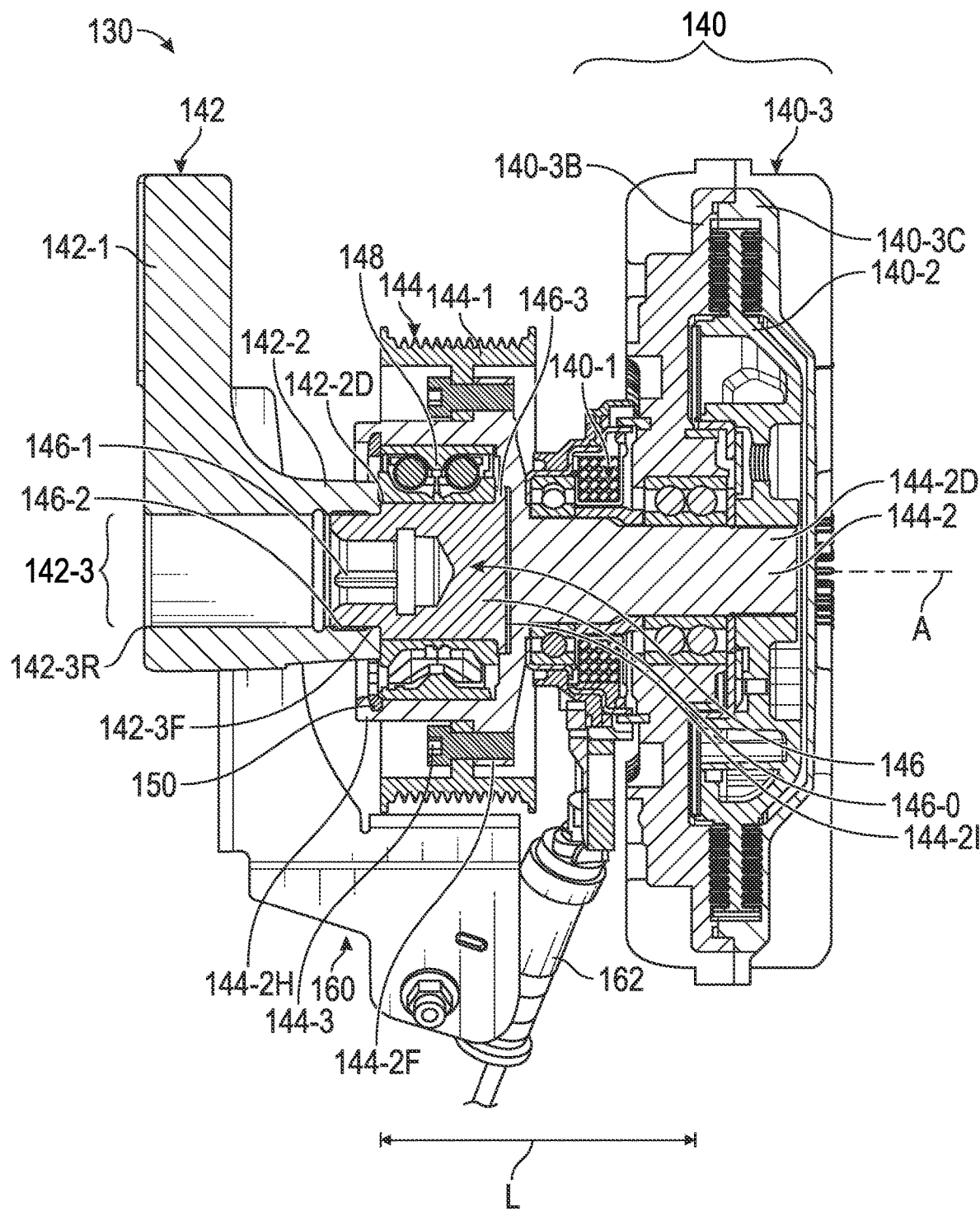
FIG. 3 is a cross-sectional view of the clutch assembly, taken along line 3-3 of FIG. 2.

FIGS. 2 and 3 illustrate an embodiment of a clutch assembly 130. FIG. 2 is a perspective view of the clutch assembly 130 and FIG. 3 is a cross-sectional view of the clutch assembly 130, taken along line 3-3 of FIG. 2. The clutch assembly 130 of the illustrated embodiment includes a clutch (or clutch mechanism) 140, a journal bracket assembly 142, an integrated pulley/shaft 144, and a threaded bracket journal 146. The clutch mechanism 140 is rotatable about an axis of rotation A.

The clutch mechanism 140 in the illustrated embodiment is configured as a viscous clutch having a coil (or control) assembly 140-1, a rotor assembly 140-2, and a housing assembly 140-3 with a housing base 140-3B and a housing cover 140-3C. Together with a suitable pump, the coil assembly 140-1 can electromagnetically control operation of the clutch mechanism 140, such as by generating magnetic flux that actuates a valve assembly to control the amount of a viscous shear fluid present in a working chamber that adjoins both the rotor assembly 140-2 and the housing assembly 140-3. The general operation of viscous clutches is known. In the illustrated embodiment, the rotor assembly 140-2 functions as a torque input and the housing assembly 140-3 functions as a torque output, and the coil assembly 140-1 is located axially in between the housing assembly 140-3 and the pulley 144-1. A reservoir for holding a supply of the shear fluid can be carried by the rotor assembly 140-2 so as to rotate whenever there is a torque input to the clutch mechanism 140. A fan or other output device (not shown in FIGS. 2 and 3, but see FIG. 1) can be attached to the housing assembly 140-3 in a suitable manner (for example, with threaded studs) to accept a torque output from the clutch mechanism 140 during operation. In the illustrated embodiment, the clutch mechanism 140 has a "live center" configuration and is supported by and on the integrated pulley/shaft 144, as discussed further below. It is further noted that the particular configuration of the clutch mechanism 140 is shown merely by way of example and not limitation. Various other viscous clutch configurations can be utilized in alternative embodiments as will be recognized by persons of ordinary skill in the art, including different reservoir, valve, and control assembly configurations.

The journal bracket assembly 142 (or simply the "bracket" or "journal bracket") has a generally radially-extending base or flange 142-1 that can be attached to a desired mounting location, plus a stub shaft 142-2 that extends axially from the base 142-1. The journal bracket assembly 142 is rotationally fixed relative to a mounting location so as to be rotationally stationary during use. In the illustrated embodiment, the base 142-1 is asymmetrical relative to the axis of rotation A. The stub shaft 142-2 can have a generally cylindrical or sleeve-like shape and can be arranged coaxially with the axis of rotation A. A passage 142-3 extends through the stub shaft 142-2 and the base 142-1 of the journal bracket assembly 142, with front and rear openings 142-3F and 142-3R at opposite front and rear sides, respectively. The passage 142-3 extends axially in the illustrated embodiment. In this sense, the stub shaft 142-2 has essentially a hollow construction. The passage 142-3 can be aligned with a center of the stub shaft 142-2 and/or can be aligned with the axis of rotation A. The rear opening 142-3R can permit a tool to be inserted into the passage 142-3 (as discussed further below), and the passage 142-3 can include threads at or near the front opening 142-3F. In the illustrated embodiment, the stub shaft 142-2 is internally threaded along the passage 142-3 at or near the front opening 142-3F. The stub shaft 142-2 has a distal end 142-2D located generally opposite the base 142-1.

The integrated pulley/shaft 144 includes a pulley 144-1 and a center shaft 144-2. In the illustrated embodiment of FIGS. 2 and 3, the pulley 144-1 and the center shaft 144-2 are discrete components connected together with fasteners 144-3 to form a unit. The clutch mechanism 140, including the coil assembly 140-1, the rotor assembly 140-2, and the housing assembly 140-3, are supported by the integrated pulley/shaft 144. In the illustrated embodiment, the rotor assembly 140-2 is rotationally fixed to the center shaft 144-2, the housing assembly 140-3 is rotationally supported on the center shaft 144-2 by housing bearings, and the coil assembly 140-1 is supported on the center shaft 144-2 by coil bearings in a rotationally fixed manner as discussed further below. Moreover, in the illustrated embodiment the center shaft 144-2 includes a distal portion 144-2D toward the front, a cup-like hub or web 144-2H toward the rear, and one or more flanges 144-2F. The distal portion 144-2D can have a generally solid (that is, non-hollow) cylindrical shape, and in some embodiments can be made of a flux-conductive material like steel to form part of a flux circuit to electromagnetically actuate the clutch mechanism 140. The distal portion 144-2D can extend axially from the cup-like hub 144-2H in a cantilevered configuration. The cup-like hub 144-2H can have a generally cylindrically shaped rear portion with a hollow interior area 144-2I as well as a forward connecting portion that extends over a radial distance to connect with the center shaft 144-2. An outer race of pulley bearings 148 can contact and engage the cup-like hub 144-2H at the hollow interior area 144-2I, and can be held in place in the axial direction with a retainer 150 such as a snap ring. For example, the retainer 150 can be engaged with the cup-like hub 144-2H and be located adjacent to the pulley bearings 148 at a rear side opposite the distal portion 1442-2D of the center shaft 144-2. In the illustrated embodiment, the cup-like hub 144-2H surrounds the pulley bearing 148 on substantially three sides, in a way that makes a front end of the journal bracket assembly 142 and the threaded bracket journal 146 "blind", that is, inaccessible for a tool from the front and/or radial directions. Moreover, the base 142-1 of the journal bracket assembly 142 and other components of the clutch assembly 130 may limit access from the rear to the area in which the pulley bearings 148 and the retainer 150 are positioned. The flange(s) 144-2F can extend radially outward from the cup-like hub 144-2H and the pulley 144-1 can be attached to the flange(s) 144-2F with the fasteners 144-3. The fasteners 144-3 can be arranged axially, though as will be clear from the present disclosure, access to the fasteners 144-3 after the integrated pulley/shaft 144 is initially assembled during manufacturing of the clutch assembly 130 is not necessary in view of other features of the clutch assembly 130 including the threaded bracket journal 146.

The integrated pulley/shaft 144 can be adjusted for each application. For example, the pulley geometry, diameter, and overall shaft/pulley axial length can be adjusted as desired for particular applications. Moreover, the configuration of the integrated pulley/shaft 144 can be adjusted independently from that of the journal bracket assembly 142 in a modular manner.

A threaded bracket journal 146 is threadably engaged with the stub shaft 142-2 at or near the distal end 142-2D of the stub shaft 142-2. As shown in the illustrated embodiment, a direct threaded connection is made between the stub shaft 142-2 and the threaded bracket journal 146 at or near the front opening 142-3F, though in alternate embodiments an indirect connection could be provided, such as with an intermediate threaded sleeve or the like. As explained further below, the threaded bracket journal 146 removably attaches the integrated pulley/shaft 144 to the stub shaft 142-2 and the rest of the journal bracket assembly 142. In the illustrated embodiment, the threaded bracket journal 146 is located at least partially within the hollow interior area 144-2I of the cup-like hub 144-2H such that there is no access to the threaded bracket journal 146 from the front or radial direction when the integrated pulley/shaft 144 is installed.

In the illustrated embodiment of FIGS. 2 and 3, the threaded bracket journal 146 includes generally a cylindrically shaped body 146-0, with one or more torque features 146-1, threads 146-2 at an outer or exterior location at or near one end, and with a flange 146-3 at an opposite end to act as a bearing stop. The integrated pulley/shaft 144 is rotatably supported on the threaded bracket journal 146 by pulley (or sheave) bearings 148. One or more race(s) of the pulley bearings 148 can directly contact and rest upon the body 146-0 of the threaded bracket journal 146, as shown in the illustrated embodiment. Moreover, in the illustrated embodiment, the body 146-0 of the threaded bracket journal 146 has a slightly smaller diameter at a rear end at the threads 146-2 than at an axially middle portion on which the pulley bearings 148 rest. The body 146-0 of the threaded bracket journal 146 can have an outer dimension (such as an outer diameter) at the portion where the pulley bearings 148 rest that is slightly smaller than a corresponding outer dimension (such as an outer diameter) of the stub shaft 142-2, and an inner race of the pulley bearings 148 can have an inner diameter that is smaller than an outer diameter of the stub shaft 142-2 at the distal end 142-2D, such that tightening the threaded engagement of the stub shaft 142-2 and the threaded bracket journal 146 creates a generally axial clamping force to secure the pulley bearings 148. The clamping force produced with the threaded bracket journal 146 can be applied to the inner race of the pulley bearings 148 between the flange 146-3 of the threaded bracket journal 146 and the distal end 142-2D of the stub shaft 142-2. In further embodiments, a stop or flange can be provided on the stub shaft 142-2 that contacts the pulley bearing 148 to react the clamping load in addition to or instead of the distal end 142-2D of the stub shaft 142-2. The torque feature(s) 146-1 can be tooling engagement faces to accept an Allen wrench, bit (for instance, a Torx® or Robertson bit), screwdriver, or another suitable tool. In the illustrated embodiment of FIGS. 2 and 3, the torque features 146-1 are arranged at a rear end of the body 146-0 and extend only partly into an interior of the body 146-0 in the axial direction, with the torque features 146-1 exposed to the passage 142-3. To secure the pulley bearing 148 in place, the threaded bracket journal 146 threadably mates with the stub shaft 142-2 of the journal bracket assembly 142. The threaded bracket journal 146 threads into (or, alternatively, onto) the stub shaft 142-2 thereby securing the pulley bearing 148 into place, which can be by way of an axial clamping force.

In the illustrated embodiment, the journal bracket assembly 142 and threaded bracket journal 146 are stationary, that is, they do not rotate when in use (though they may be in a vehicle that is movable). During operation, the integrated pulley/shaft 144 and the fixedly attached rotor assembly 140-2 of the clutch mechanism 140 can spin together at an input rotational speed with torque provided to the pulley 144-1 by a belt, which in turn is powered by an internal combustion engine or another prime mover (see FIG. 1). The clutch housing assembly 140-3 (including the housing base 140-3B and cover 140-3C) and attached output device (such as a fan) can then rotate at a commanded output speed as a function of the operation of the clutch mechanism 140 (for instance, as a function of the amount of viscous shear fluid present in a working chamber where the clutch mechanism 140 is configured as a viscous clutch).

The pulley 144-1, the cup-like hub 144-2H, the fasteners 144-3, the body 146-0 of the threaded bracket journal 146, and the pulley bearings 148 can be axially aligned, or at least can partially overlap each other in the axial direction. In this way, forces applied to the pulley 144-1 by a belt can be substantially aligned with the pulley bearings 148, which can help reduce the magnitude of forces and loads that must be supported by the center shaft 144-2. Some or all of the forces applied to the pulley bearings 148 are transmitted through the threaded bracket journal 146 when the clutch assembly 130 is installed and under load. In this respect, the threaded journal bracket 146 carries overhung loads transmitted through the pulley bearings 148, and is not merely used to generate axial clamping force like a threaded nut. As shown in the illustrated embodiment, the rear opening 142-3R of the passage 142-3 through the base 142-1 and the stub shaft 142-2 of the journal bracket assembly 142 allows a suitable tool to be inserted from the rear to secure the threaded bracket journal 146 to the stub shaft 142-2 (for instance, to rotate the threaded bracket journal 146 relative to the stub shaft 142-2 to tighten the threads 146-2). At the same time, the integrated pulley/shaft 144 can be constructed as a unit, with the cup-like hub 144-2H (plus the center shaft 144-1) surrounding the pulley bearings 148 on substantially three sides, in a way that makes the front end of a subassembly including the threaded bracket journal 146 and the journal bracket assembly 142 "blind", that is, inaccessible for a tool from the front and radial directions. This allows for an advantageous configuration of the integrated pulley/shaft 144 (and of the clutch mechanism 140) while still allowing the integrated pulley/shaft 144 to be rotatably secured to and supported on the stub shaft 142-2 by way of the pulley bearings 148.

The disclosed embodiments of the clutch assembly provide numerous features and benefits, including a relatively low part count, a relatively small first-groove-to-fan-mount axial length L of the assembly (which can be characterized as an axial projected distance from a first or rearmost groove of the pulley to the mounting location of the fan, as indicated in FIG. 3), avoidance of a need for clearance space between the pulley and viscous clutch to place and attach coupling fasteners or get an assembly tool in place in that location, and the absence of a threaded hex shaft or bolted flange shaft joint that needs to be accessible during maintenance (after installation and use). Furthermore, the threaded bracket journal allows the journal bracket assembly to be attached to the rest of the clutch assembly last (or as one of the last few steps) during fabrication so that the relatively large and massive journal bracket assembly is not required to be moved through an entire assembly line, which allows for implementation of more assembly automation, common fixturing, and quicker assembly, while still allowing for a modular bracket and integrated pulley/shaft design.

FIGS. 2 and 3 also show an embodiment of an integrated anti-rotation bracket (ARB) and guard 160 installed as part of the clutch assembly 130. In general, the integrated ARB and guard 160 provides an anti-rotation attachment/connection point for the coil assembly 140-1, by providing a substantially rigid and rotationally fixed connection from the coil assembly 140-1 to the stationary (that is, non-rotating) journal bracket assembly 142, and also guards electrical components from belt breakage or "bucking" events. As shown in the illustrated embodiment, the integrated ARB and guard 160 includes a flange 160-1, base portion 160-2, a barrier 160-3, a gusset 160-4, and a mounting extension 160-5.

The flange 160-1 can extend radially or tangentially with respect to the axis of rotation A and can be secured to the journal bracket assembly 142 with suitable fasteners or the like. In the illustrated embodiment, a portion of the flange 160-1 is positioned at least partially in and secured to a recess or notch in the base 142-1 of the journal bracket assembly 142 with threaded fasteners at a location radially outward from the stub shaft 142-2.

The base portion 160-2 can extend axially away from the flange 160-1 and can overlap with the pulley 144-1 of the integrated pulley/shaft assembly 144 in the axial direction. The barrier 160-3 can extend from the base portion 160-2 and can be aligned or at least partially overlap with the pulley 144-1 at a location adjacent to the pulley 144-1 and axially spaced from the flange 160-1. As shown most clearly in FIG. 2, the barrier 160-3 can be configured to extend substantially perpendicular to an adjoining region of the base portion 160-2 to one side of the base portion 160-2, such that the barrier 160-3 is roughly (though not precisely) tangential to the pulley 144-1. The barrier 160-3 helps provide rigidity to the integrated ARB and guard 160 but also provides a web of material that helps physically isolate the belt (not shown) engaged with the pulley 144-1 from sensitive electrical components.

The gusset 160-4 links the flange 160-1 and the base portion 160-2 to help increase rigidity and structural strength. In the illustrated embodiment, a U-shaped channel separates the barrier 160-3 from the gusset 160-4 in the axial direction. The mounting extension 160-5 protrudes from the base portion 160-2 at an oblique angle, for example, the mounting extension 160-5 can be angled so as to be arranged substantially radially with respect to the axis of rotation A. The mounting extension 160-5 provides an anti-rotation attachment point for the coil assembly 140-1, with the integrated ARB and guard 160 as a whole providing a substantially rigid connection from the coil assembly 140-1 to the stationary (that is, non-rotating) journal bracket assembly 142. This allows the coil assembly 140-1 to resist rotation induced by, for instance, friction in the coil bearings that rotatably support the coil assembly 140-1 on the rotatable center shaft 144-2. Moreover, in this way, generally opposite ends of the integrated ARB and guard 160 can be connected to the journal bracket assembly 142 and the coil assembly 140-1.

A cable 162 containing suitable wiring can extend from the coil assembly 140-1 to a power supply, an external clutch controller, an engine controller, an overall vehicle controller, or the like (not shown). The cable 162 can be secured to the integrated ARB and guard 160 with a harness 164, located at or near a front end of the mounting extension 160-5 (and a front end of the base portion 160-2), with the cable 162 protected by the barrier 160-3 and the base portion 160-2. The mounting extension 160-5 can include fastener openings, clamp points, or the like to facilitate the attachment of electrical components. In the illustrated embodiment, the harness 164 is attached to the mounting extension 160-5 at a location that is aligned with the barrier 160-3 in the axial direction.

In further embodiments a controller can be attached to the mounting extension 160-5. In some embodiments, the controller can be utilized as an external electronic closed loop clutch controller to convert control signals from an engine or vehicle controller into commands that operate the coil assembly 140-1, among other functions. For example, the controller can be or function similarly to a Di+® controller (available from Horton, Inc., Roseville, Minn., USA). Such a controller can alternatively be located remotely from the integrated ARB and guard 160.

The particular shape and configuration of the integrated ARB and guard 160 shown in FIGS. 2 and 3 is provided merely by way of example and not limitation. In alternate embodiments, the integrated ARB and guard 160 can have a different configuration; for instance, the mounting extension 160-5 could be admitted and components connected directly to the base portion 160-2. Likewise, the gusset 160-4 could be omitted in further embodiments.

The integrated ARB and guard 160 provides multiple functions and numerous benefits. For example, the integrated ARB and guard 160 provides anti-rotation functionality for the coil assembly 140-1 and the associated cable 162. Moreover, the integrated ARB and guard 160 provides protection to the wires/cables and other electrical components in case of a sudden belt break or belt "buck" event, which can be achieved in part by positioning the base portion 160-2 and/or the barrier 160-3 between the pulley 144-1 and the cable 162. Such protection is available even when using a viscous clutch mechanism with a "live center" configuration that generally precludes running wires or cables through the interior of the rotatable "live" center shaft 144-2. These benefits result in less maintenance and longer uptime for the clutch assembly 130. Additionally, the integrated ARB and guard 160 provides a location and structural features to mount an optional (external) clutch controller, which can further be protected by the base portion 160-2 and/or the barrier 160-3. With the controller attached, such as in a pre-attached manner, the integrated ARB and guard 160 with the controller provides a "plug and play" clutch solution for end users, which reduces installation work for the end user.

Figure 4:
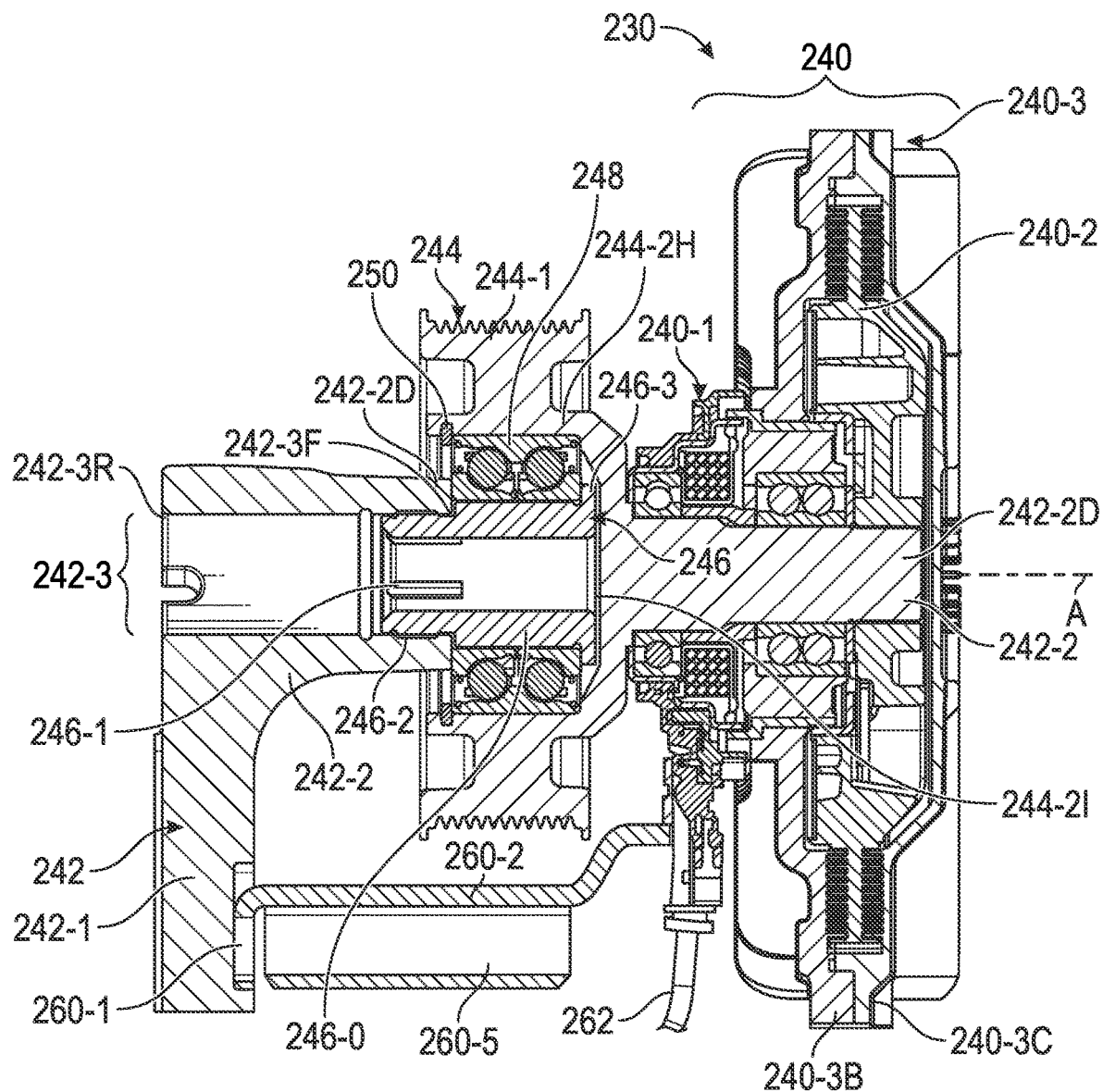
FIG. 4 is a cross-sectional view of another embodiment of a clutch assembly.

FIG. 4 is a cross-sectional view of another embodiment of a clutch assembly 230. The clutch assembly 230 has a configuration and function similar to that of the clutch assembly 130 described above. As such, similar reference numbers are used in FIG. 4 with those reference numbers increased by one hundred compared to those used in FIGS. 2 and 3. For instance, the clutch assembly 230 of the illustrated embodiment includes a clutch (or clutch mechanism) 240, a journal bracket assembly 242, an integrated pulley/shaft 244, and a threaded bracket journal 246. The clutch mechanism 240 is rotatable about an axis of rotation A, and includes a coil assembly 240-1, a rotor assembly 240-2, and a housing assembly 240-3 (with a housing base 240-3B and a housing cover 240-3C). The journal bracket assembly 242 includes a generally radially-extending flange 242-1 and a stub shaft 242-2 having a distal end 242-2D located generally opposite the base 242-1. An axial passage 242-3 extends through the base 242-1 and a center of the stub shaft 242-2, with front and rear openings 242-3F and 242-3R at opposite front and rear sides, respectively. The rear opening 242-3R can permit a tool to be inserted into the passage 242-3, and the passage 142-3 can include threads at or near the front opening 242-3F. In the illustrated embodiment, the stub shaft 142-2 is internally threaded along the passage 142-3 at or near the front opening 142-3F. The integrated pulley/shaft 244 includes a pulley 244-1 and a center shaft 244-2 with a "live" configuration. The center shaft 244-2 includes a distal portion 244-2D toward the front, a cup-like hub or web 244-2H toward the rear. The distal portion 244-2D can have a generally solid (that is, non-hollow) cylindrical shape. The cup-like hub 244-2H can have a generally cylindrically shaped rear portion with a hollow interior area 244-2I as well as a forward connecting portion that extends over a radial distance to connect with the center shaft 244-2. A threaded bracket journal 246 is threadably engaged with the stub shaft 242-2 at or near the distal end 242-2D of the stub shaft 142-2. As shown in the illustrated embodiment, a direct threaded connection is made between the stub shaft 242-2 and the threaded bracket journal 246 at or near the front opening 242-3F, though in alternate embodiments an indirect connection could be provided, such as with an intermediate threaded sleeve or the like. Moreover, in the illustrated embodiment, the threaded bracket journal 246 has a hollow cylindrical shape, with a center opening that passes entirely through a body 246-0. The threaded bracket journal 246 further includes threads 246-2 and a flange 246-3. An outer race of pulley bearings 248 can contact and engage the cup-like hub 244-2H at the hollow interior area 244-2I, and can be held in place in the axial direction with a retainer 250 such as a snap ring, with an inner race of the pulley bearings 248 supported on the threaded bracket journal 246. In the illustrated embodiment, the cup-like hub 244-2H surrounds the pulley bearing 248 on substantially three sides, in a way that makes a front end of the journal bracket assembly 242 and the threaded bracket journal 246 "blind", that is, inaccessible for a tool from the front and radial directions. The threaded bracket journal 246 can axially clamp the pulley bearings 248, while also providing support for the pulley bearings 248 in a radial direction.

In the illustrated embodiment of FIG. 4, the pulley 244-1 and the center shaft 244-2 are integrated into one monolithic component. In this respect, the pulley 244-1 and the center shaft 244-2 are inseparable in the illustrated embodiment. Such a configuration of the integrated pulley/shaft 244 helps to further reduce part count compared to the embodiment of the integrated pulley/shaft 144 of FIGS. 2 and 3, but at the same time, as trade-offs, reduces design modularity and increases applications-specific design and manufacturing efforts.

The clutch assembly 230 also includes an integrated ARB and guard 260. As shown in the illustrated embodiment, the integrated ARB and guard 260 is a generally horizontally or axially-extending structure that is the secured to both the journal bracket assembly 242 and the coil assembly 240-1 of the clutch mechanism 240 at a location radially outward from the pulley 244-1 (and an associated belt). In the illustrated embodiment, the integrated ARB and guard 260 includes a flange 260-1 and a base portion 260-2. A front end of the base portion 260-2, which can be stepped radially inwardly, provides an anti-rotation attachment/connection point for the coil assembly 240-1 and an associated cable 262, by providing a substantially rigid connection from the coil assembly 240-1 and the cable 262 to the stationary (that is, non-rotating) journal bracket assembly 242. A mounting extension 260-5 can also be provided, which provides a space to mount an optional external controller (not shown).

Figure 5:
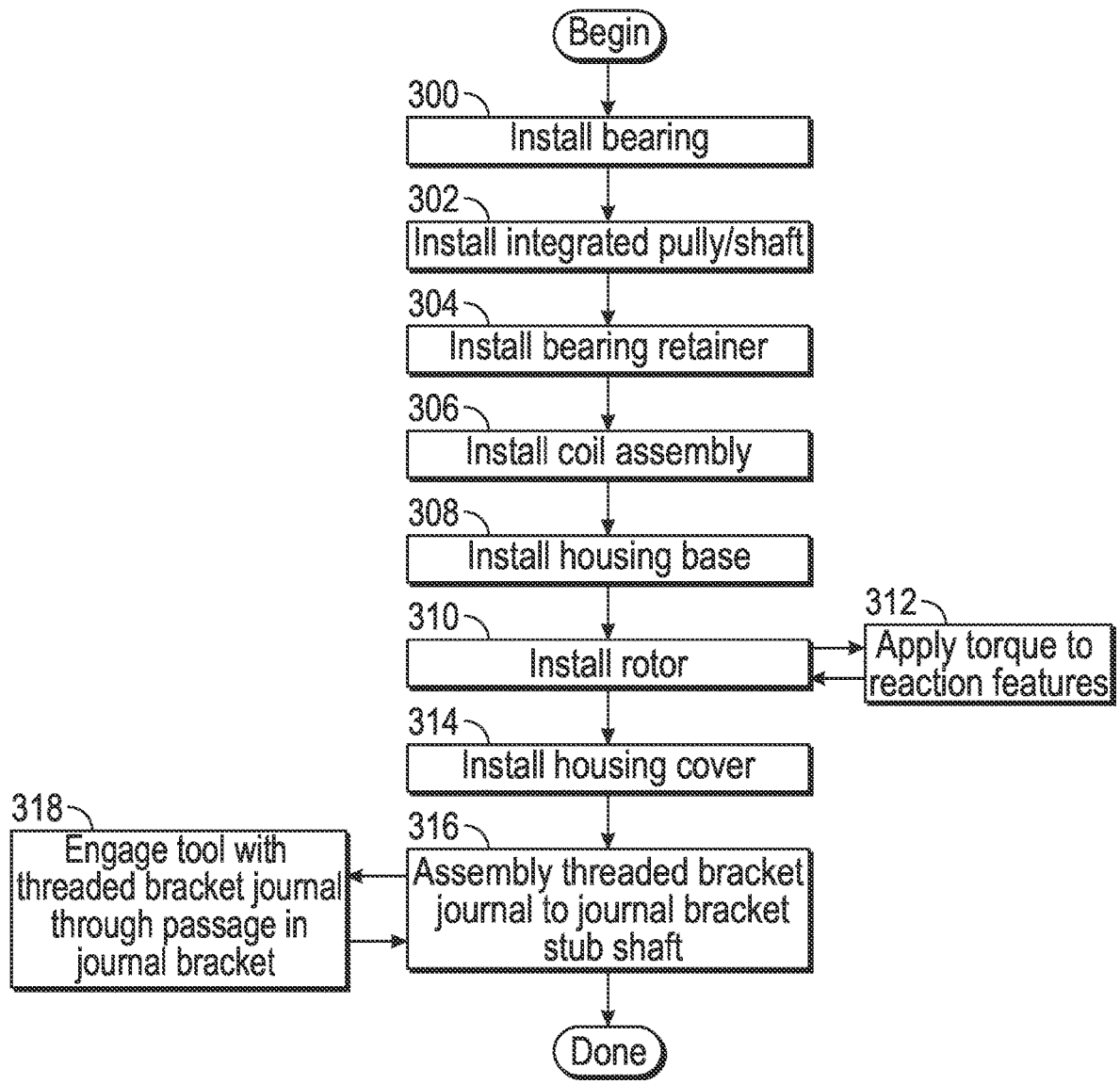
FIG. 5 is a flow chart of an embodiment of a method of making a clutch assembly according to the present invention.

FIG. 5 is a flow chart of an embodiment of a method of making a clutch assembly, such as the clutch assemblies 30, 130, or 230. First, the pulley bearings 148 or 248 are placed on the threaded bracket journal 146 or 246, in contact with the flange 146-3 or 246-3 that acts as a bearing stop to create a subassembly (Step 300). Then the integrated pulley/shaft 44, 144 or 244 is installed (e.g., pressed) onto the subassembly of the pulley bearings 148 or 248 and the threaded bracket journal 146 or 246 (Step 302). In embodiments in which the integrated pulley/shaft 144 is configured as a unit made up of separate pulley 144-1 and center shaft 144-2 sub-components, those sub-components are secured together (for example with the fasteners 144-3) to form an integrated unit before installing that unit onto the subassembly of the pulley bearings 148 or 248 and the threaded bracket journal 146 or 246 as part of Step 302. A retainer 150 or 250, such as a snap ring, can then be installed to at least temporarily retain the pulley bearings 148 or 248 relative to the integrated pulley/shaft 44, 144 or 244 (Step 304). Next, the coil assembly 140-1 or 240-1, including any associated spacer (if used), is installed on the center shaft 144-2 or 244-2 of the integrated pulley/shaft 44, 144 or 244 (Step 306). Next, the housing base 140-3B or 240-3B, including any inner pole assembly for a flux circuit that transmits flux generated by the coil assembly 140-1 or 240-1 through the clutch mechanism 40, 140 or 240 during use, is installed on the center shaft 144-2 or 244-2 of the integrated pulley/shaft 44, 144 or 244 (Step 308). Next, the rotor assembly 140-2 or 240-2 is installed on the center shaft (Step 310). As part of Step 310, or as part of a related but separate Step 312, reaction features can be used to apply assembly torque to a joint between the rotor assembly 140-2 or 240-2 and the center shaft 144-2 or 244-2 with suitable tooling. Next, the housing cover 140-3C or 240-3C is installed onto the housing base 140-3B or 240-3B, which can enclose the rotor assembly 140-2 or 240-2 within the housing assembly 140-3 or 240-3 (Step 314). Lastly, the journal bracket assembly 42, 142 or 242 is assembled with the threaded bracket journal 146 or 246 (Step 316). As part of Step 316, or as part of a related but separate Step 318, a suitable tool is engaged with the threaded bracket journal 146 or 246 through the passage 142-3 or 242-3 in the base 142-1 or 242-1 and the stub shaft 142-2 or 242-2 of the journal bracket assembly 142 or 242 in order to torque and tighten the threaded connection between those components. The threaded engagement between the threaded bracket journal 146 or 246 and the stub shaft 142-2 or 242-2 of the journal bracket assembly 142 or 242 concurrently produces a clamping force on the pulley bearings 148 or 248. This clamping force produced with the threaded bracket journal 146 or 246 in the axial direction can render the pulley bearing retainer 150 or 250 (such as a snap ring) superfluous, or at least axially unloaded, during later operation of the fully constructed clutch assembly 30, 130 or 230.

In embodiments in which the integrated ARB and guard 160 or 260 is used, the method can further include attaching the integrated ARB and guard 160 or 260 to the journal bracket assembly 42, 142, 242 and securing the coil assembly 140-1 or 240-1 and/or the cable 162 or 262 to the integrated ARB and guard 160 or 260 with the harness 164 or the like. It is possible to attach the integrated ARB and guard 160 or 260 to the journal bracket assembly 42, 142, 242 either before or after the journal bracket assembly 42, 142, or 242 is coupled to the threaded bracket journal 146 or 246. Securing the coil assembly 140-1 or 240-1 and/or the cable 162 or 262 to the integrated ARB and guard 160 or 260 will occur after the journal bracket assembly 42, 142, or 242 is coupled to the threaded bracket journal 146 or 246.

Because the journal bracket assembly 42, 142 or 242 is relatively massive, its installation at Step 316 at or near the end of the assembly process means that a much smaller and less massive (that is, lighter) workpiece is involved in preceding Steps 300 to 314. This facilitates manufacturing in an assembly-line type of environment, though prior art clutch assemblies typically required earlier assembly of the journal bracket and movement of such a massive workpiece through stations in a factory for most or all of the assembly process.

In light of the entirety of the present disclosure, a method of using the disclosed clutch assembly will be apparent to those of ordinary skill in the art.

Discussion of Possible Embodiments

A clutch assembly can include a journal bracket assembly having a base, a stub shaft that extends axially from the base, and a passage that extends through the base and the stub shaft between opposite front and rear openings, with the journal bracket assembly being rotationally stationary; a threaded bracket journal threadably coupled to the stub shaft, such that the threaded bracket journal is accessible through the rear opening of the passage; pulley bearings supported on the threaded bracket journal in a radial direction; an integrated pulley/shaft including a pulley and a center shaft, with the center shaft including a cup-like hub and a distal portion that extends axially from the cup-like hub, the cup-like hub being supported on the pulley bearings, the pulley bearings located at least partially within a hollow interior area of the cup-like hub, the threaded bracket journal located at least partially within the hollow interior area of the cup-like hub, and the hollow interior area of the cup-like hub being blind from front and radial directions; and a clutch mechanism supported on the distal portion of the center shaft, with the distal portion of the center shaft defining an axis of rotation of the clutch mechanism.

The clutch assembly of the preceding paragraph can optionally include, additionally and/or alternatively, any one or more of the following features, configurations and/or additional components:

the threaded bracket journal can include a flange configured as a bearing stop;

the pulley bearings can be axially clamped against the stub shaft by the threaded bracket journal;

the threaded bracket journal can include a torque feature exposed to the passage such that a tool inserted into the passage from a rear of the base can engage the torque feature;

the threaded bracket journal can include threads that engage internal threads on the stub shaft along the passage;

the pulley can overlap the pulley bearings in an axial direction;

a retainer engaged with the cub-like hub and positioned adjacent to the pulley bearings opposite the distal portion of the center shaft;

the clutch mechanism can be a viscous clutch;

the viscous clutch can include a coil assembly supported on the distal portion of the center shaft axially in between the pulley and a housing assembly of the viscous clutch;

an integrated anti-rotation bracket (ARB) and guard attached to the journal bracket assembly;

the coil assembly can be rotationally fixed to the integrated ARB and guard;

the integrated ARB and guard can include a flange, a body portion that extends axially, and a barrier that extends from the body portion and is located adjacent to the pulley;

the integrated ARB and guard can further include a mounting extension, with a harness attached to the mounting extension, the harness securing a cable that is electrically connected to the coil assembly;

a fan attached to the clutch mechanism; and/or the clutch assembly can be part of a cooling system in an engine compartment, which can be part of a vehicle.

A method of making a clutch assembly includes installing pulley bearings on a threaded bracket journal; installing an integrated pulley/shaft on the pulley bearing, with the pulley bearings positioned at least partially within a blind interior area of a cup-like hub of the integrated pulley/shaft; installing a coil assembly on the integrated pulley/shaft after the integrated pulley/shaft is installed on the integrated pulley/shaft; installing a housing base on the integrated pulley/shaft after the coil assembly is installed on the integrated pulley/shaft; installing a rotor assembly on the integrated pulley/shaft after the housing base is installed on the integrated pulley/shaft; installing a housing cover on the integrated pulley/shaft after the rotor assembly is installed on the integrated pulley/shaft; assembling a journal bracket assembly to the threaded bracket journal after the housing cover is installed on the integrated pulley/shaft; and engaging a tool with a torque feature of the threaded bracket journal to threadably couple the threaded bracket journal and the journal bracket assembly. The tool is inserted through a rear opening and into a passage in the journal bracket assembly.

The method of the preceding paragraph can optionally include, additionally and/or alternatively, any one or more of the following features, configurations and/or additional steps:

moving components of the clutch assembly between multiple stations in a factory prior to the step of assembling the journal bracket assembly to the threaded bracket journal;

installing a retainer on the integrated pulley/shaft to at least temporarily axially retain the pulley bearings;

axially clamping the pulley bearings between the journal bracket assembly and the threaded bracket journal;

a race of the pulley bearings can be axially clamped between a distal end of a stub shaft of the journal bracket assembly and a flange of the threaded bracket journal;

applying torque to secure the rotor assembly to a center shaft of the integrated pulley/shaft;

attaching an integrated anti-rotation bracket (ARB) and guard to the journal bracket assembly and securing the coil assembly to the integrated ARB and guard; and/or the coil assembly can be secured to the integrated ARB and guard after the threaded bracket journal is coupled to the journal bracket assembly.

An integrated anti-rotation bracket (ARB) and guard assembly for use with a clutch includes a body portion that extends axially; a flange that extends from the body portion; a barrier that extends from the body portion, the barrier being axially spaced from the flange; a mounting extension that extends from the body portion; and a harness attached to the mounting extension at a location aligned with the barrier in an axial direction.

The integrated ARB and guard assembly of the preceding paragraph can optionally include, additionally and/or alternatively, any one or more of the following features, configurations and/or additional components:

a journal bracket assembly including a base, in which the flange is secured to the base, and in which the journal bracket is rotationally stationary;

a cable containing a wire, with the harness attached to the cable;

a pulley;

a center shaft rotationally fixed to the pulley and defining an axis of rotation;

a clutch mechanism supported on the center shaft, the clutch mechanism including a coil assembly supported on the center shaft;

the coil assembly can be rotationally fixed to the mounting extension;

the mounting extension can extend in a radial direction at an oblique angle relative to the body portion; and/or the barrier can extend perpendicularly from the body portion.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For example, while a threaded connection between the stub shaft and the threaded bracket journal is illustrated as being located along an interior of a passage in the stub shaft, the threaded connection can be located at an outer or exterior portion of the stub shaft in alternate embodiments. Moreover, in an alternative embodiment a bayonet, splined and pinned, or other type of attachment can be used instead of a threaded connection, in which case the threaded bracket journal need not be threaded.

The invention claimed is:

1. A clutch assembly comprising:
   a journal bracket assembly having a base, a stub shaft that extends axially from the base, and a passage that extends through the base and the stub shaft between opposite front and rear openings, wherein the journal bracket assembly is rotationally stationary;
   a threaded bracket journal threadably coupled to the stub shaft, wherein the threaded bracket journal is accessible through the rear opening of the passage;
   pulley bearings supported on the threaded bracket journal in a radial direction;
   an integrated pulley/shaft including a pulley and a center shaft, wherein the center shaft includes a cup-like hub and a distal portion that extends axially from the cup-like hub, wherein the cup-like hub is supported on the pulley bearings, wherein the pulley bearings are located at least partially within a hollow interior area of the cup-like hub, wherein the threaded bracket journal is located at least partially within the hollow interior area of the cup-like hub, and wherein the hollow interior area of the cup-like hub is blind from front and radial directions; and
   a clutch mechanism supported on the distal portion of the center shaft, with the distal portion of the center shaft defining an axis of rotation of the clutch mechanism.

2. The clutch assembly of claim 1, wherein the threaded bracket journal includes a flange configured as a bearing stop.

3. The clutch assembly of claim 1, wherein the pulley bearings are axially clamped against the stub shaft by the threaded bracket journal.

4. The clutch assembly of claim 1, wherein the threaded bracket journal includes a torque feature exposed to the passage such that a tool inserted into the passage from a rear of the base can engage the torque feature.

5. The clutch assembly of claim 1, wherein the threaded bracket journal includes threads that engage internal threads on the stub shaft along the passage.

6. The clutch assembly of claim 1, wherein the pulley overlaps the pulley bearings in an axial direction.

7. The clutch assembly of claim 1 and further comprising:
   a retainer engaged with the cup-like hub and positioned adjacent to the pulley bearings opposite the distal portion of the center shaft.

8. The clutch assembly of claim 1, wherein the clutch mechanism is a viscous clutch.

9. The clutch assembly of claim 8, wherein the viscous clutch includes a coil assembly supported on the distal portion of the center shaft axially in between the pulley and a housing assembly of the viscous clutch.

10. The clutch assembly of claim 1 and further comprising:
    an integrated anti-rotation bracket (ARB) and guard attached to the journal bracket assembly, wherein a coil assembly is rotationally fixed to the integrated ARB and guard.

11. The clutch assembly of claim 10, wherein the integrated ARB and guard includes a flange, a body portion that extends axially, and a barrier that extends from the body portion and is located adjacent to the pulley.

12. The clutch assembly of claim 11, wherein the integrated ARB and guard further includes a mounting extension, wherein a harness is attached to the mounting extension, the harness securing a cable that is electrically connected to the coil assembly.

13. The clutch assembly of claim 1 and further comprising:
    a fan attached to the clutch mechanism.

14. A method of making a clutch assembly, the method comprising:
    installing pulley bearings on a threaded bracket journal;
    installing an integrated pulley/shaft on the pulley bearings, with the pulley bearings positioned at least partially within a blind interior area of a cup-like hub of the integrated pulley/shaft;
    installing a coil assembly on the integrated pulley/shaft after the integrated pulley/shaft is installed on the pulley bearings;
    installing a housing base on the integrated pulley/shaft after the coil assembly is installed on the integrated pulley/shaft;
    installing a rotor assembly on the integrated pulley/shaft after the housing base is installed on the integrated pulley/shaft;
    installing a housing cover on the integrated pulley/shaft after the rotor assembly is installed on the integrated pulley/shaft;
    assembling a journal bracket assembly to the threaded bracket journal after the housing cover is installed on the integrated pulley/shaft; and
    engaging a tool with a torque feature of the threaded bracket journal to threadably couple the threaded bracket journal and the journal bracket assembly, wherein the tool is inserted through a rear opening and into a passage in the journal bracket assembly.

15. The method of claim 14 and further comprising:
moving components of the clutch assembly between multiple stations in a factory prior to the step of assembling the journal bracket assembly to the threaded bracket journal.

16. The method of claim 14 and further comprising:
installing a retainer on the integrated pulley/shaft to at least temporarily axially retain the pulley bearings.

17. The method of claim 14 and further comprising:
axially clamping the pulley bearings between the journal bracket assembly and the threaded bracket journal.

18. The method of claim 17, wherein a race of the pulley bearings is axially clamped between a distal end of a stub shaft of the journal bracket assembly and a flange of the threaded bracket journal.

19. The method of claim 14 and further comprising:
applying torque to secure the rotor assembly to a center shaft of the integrated pulley/shaft.

20. The method of claim 14 and further comprising:
attaching an integrated anti-rotation bracket (ARB) and guard to the journal bracket assembly and securing the coil assembly to the integrated ARB and guard, wherein the coil assembly is secured to the integrated ARB and guard after the threaded bracket journal is coupled to the journal bracket assembly.

21. An integrated anti-rotation bracket (ARB) and guard assembly for use with a clutch, the assembly comprising:
a body portion that extends axially;
a flange that extends from the body portion;
a barrier that extends from the body portion, the barrier being axially spaced from the flange;
a mounting extension that extends from the body portion; and
a harness attached to the mounting extension at a location aligned with the barrier in an axial direction.

22. The assembly of claim 21 and further comprising:
a journal bracket assembly including a base, wherein the flange is secured to the base, and wherein the journal bracket assembly is rotationally stationary; and
a cable containing a wire, wherein the harness is attached to the cable.

23. The assembly of claim 22 and further comprising:
a pulley;
a center shaft rotationally fixed to the pulley and defining an axis of rotation; and
a clutch mechanism supported on the center shaft, the clutch mechanism including a coil assembly supported on the center shaft, wherein the coil assembly is rotationally fixed to the mounting extension.

24. The assembly of claim 21, wherein the mounting extension extends in a radial direction at an oblique angle relative to the body portion, and wherein the barrier extends perpendicularly from the body portion.

* * * * *